(12) United States Patent
Coughlin (10) Patent No.: US 8,713,747 B2
(45) Date of Patent: May 6, 2014

(54) WIPER COUPLER AND WIPER ASSEMBLY INCORPORATING SAME

(71) Applicant: Trico Products Corporation, Rochester Hills, MI (US)

(72) Inventor: Timothy J. Coughlin, Holly, MI (US)

(73) Assignee: Trico Products Corporation, Rochester Hills, MI (US)

( * ) Notice: Subject to any disclaimer, the term of this patent is extended or adjusted under 35 U.S.C. 154(b) by 0 days.

(21) Appl. No.: 13/845,337

(22) Filed: Mar. 18, 2013

(65) Prior Publication Data

US 2013/0212827 A1 Aug. 22, 2013

Related U.S. Application Data

(60) Division of application No. 12/819,363, filed on Jun. 21, 2010, now Pat. No. 8,468,641, which is a continuation of application No. 11/397,048, filed on Apr. 3, 2006, now Pat. No. 7,774,892.

(60) Provisional application No. 60/668,025, filed on Apr. 4, 2005.

(51) Int. Cl.
*B60S 1/40* (2006.01)
*B60S 1/38* (2006.01)

(52) U.S. Cl.
USPC .................................. 15/250.32; 15/250.351

(58) Field of Classification Search
USPC ............. 15/250.32, 250.43, 250.44, 250.351, 15/250.361
See application file for complete search history.

(56) References Cited

U.S. PATENT DOCUMENTS

| | | | |
|---|---|---|---|
| 2,589,339 A | 3/1952 | Carson |
| 2,616,112 A | 11/1952 | Smulski |
| 2,643,411 A | 6/1953 | Nesson |
| 2,799,887 A | 7/1957 | Nemic |
| 2,801,436 A | 8/1957 | Scinta |
| 2,814,820 A | 12/1957 | Elliott et al. |
| 2,932,843 A | 4/1960 | Zaiger et al. |
| 2,937,393 A | 5/1960 | Brueder |
| 2,946,078 A | 7/1960 | Deibel et al. |
| 2,974,341 A | 3/1961 | Hart |
| 3,029,460 A | 4/1962 | Hoyler |
| 3,037,233 A | 6/1962 | Peras et al. |
| 3,056,991 A | 10/1962 | Smithers |

(Continued)

FOREIGN PATENT DOCUMENTS

| | | |
|---|---|---|
| DE | 1028896 B | 4/1958 |
| DE | 1247161 B | 8/1967 |

(Continued)

*Primary Examiner* — Gary Graham
(74) *Attorney, Agent, or Firm* — Howard & Howard Attorneys PLLC (57) ABSTRACT

The present invention relates to a wiper coupler that releasably attaches the superstructure to a wiper arm attachment member. The wiper coupler includes a pair of sidewalls each having a flange to engage a portion of the guides of the attachment member and further includes an elevated platform and a deck each disposed between the sidewalls. The deck and a portion of the sidewalls define a rest to receive the track of the attachment member. The wiper coupler further includes an aperture between the elevated platform and the deck. The aperture receives a portion of the bent tab of the attachment member to facilitate attachment between the superstructure and the attachment member conventionally employed for use with a beam blade-style wiper assembly.

4 Claims, 5 Drawing Sheets

(56) References Cited

U.S. PATENT DOCUMENTS

| | | |
|---|---|---|
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,132,367 A | 5/1964 | Wise |
| 3,147,507 A | 9/1964 | Glynn |
| 3,179,969 A | 4/1965 | Glynn |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| 3,378,874 A | 4/1968 | Scinta |
| D211,570 S | 7/1968 | Tomlin |
| 3,418,679 A | 12/1968 | Barth et al. |
| 3,480,986 A | 12/1969 | Forster |
| 3,588,942 A | 6/1971 | Schlesinger |
| 3,618,155 A | 11/1971 | Mower |
| 3,641,614 A | 2/1972 | Newsome |
| 3,665,544 A | 5/1972 | Sakamoto |
| 3,673,631 A | 7/1972 | Yamadai et al. |
| 3,685,086 A | 8/1972 | Froehlich |
| 3,751,754 A | 8/1973 | Quinlan et al. |
| 3,780,395 A | 12/1973 | Quinlan et al. |
| 3,845,519 A | 11/1974 | Quinlan et al. |
| 3,862,465 A | 1/1975 | Ito |
| 3,872,537 A | 3/1975 | Biachi |
| 3,879,793 A | 4/1975 | Schlegel |
| 3,881,214 A | 5/1975 | Palu |
| 4,028,770 A | 6/1977 | Appel |
| 4,063,328 A | 12/1977 | Arman |
| 4,083,642 A | 4/1978 | Journee |
| 4,102,003 A | 7/1978 | Hancu |
| 4,127,916 A | 12/1978 | van den Berg et al. |
| 4,132,490 A | 1/1979 | Journee |
| 4,158,513 A | 6/1979 | Journee |
| 4,224,001 A | 9/1980 | Arndt et al. |
| 4,300,259 A | 11/1981 | Maiocco |
| 4,309,790 A | 1/1982 | Bauer et al. |
| 4,339,839 A | 7/1982 | Knights |
| 4,343,063 A | 8/1982 | Batt |
| D267,939 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| 4,570,284 A | 2/1986 | Verton |
| 4,587,686 A | 5/1986 | Thompson |
| 4,590,638 A | 5/1986 | Beneteau |
| 4,741,071 A | 5/1988 | Bauer et al. |
| 4,766,636 A | 8/1988 | Shinpo |
| 4,782,547 A | 11/1988 | Mohnach |
| 4,807,326 A | 2/1989 | Arai et al. |
| 4,852,206 A | 8/1989 | Fisher |
| D307,408 S | 4/1990 | Mower et al. |
| D308,660 S | 6/1990 | Fisher |
| D308,845 S | 6/1990 | Charet et al. |
| 4,976,001 A | 12/1990 | Wright |
| 4,980,944 A | 1/1991 | Longman |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| 5,084,933 A | 2/1992 | Buechele |
| 5,086,534 A | 2/1992 | Journee |
| 5,093,954 A | 3/1992 | Kuzuno |
| 5,123,140 A | 6/1992 | Raymond |
| 5,138,739 A | 8/1992 | Maubray |
| 5,168,596 A | 12/1992 | Maubray |
| 5,168,597 A | 12/1992 | Schoen et al. |
| 5,170,527 A | 12/1992 | Lyon, II |
| 5,179,761 A | 1/1993 | Buechele et al. |
| 5,206,969 A | 5/1993 | Patterson et al. |
| 5,218,735 A | 6/1993 | Maubray |
| 5,228,167 A | 7/1993 | Yang |
| 5,233,721 A | 8/1993 | Yang |
| 5,257,436 A | 11/1993 | Yang |
| 5,276,937 A | 1/1994 | Lan |
| 5,283,925 A | 2/1994 | Maubray |
| 5,307,536 A | 5/1994 | Lescher |
| 5,311,636 A | 5/1994 | Lee |
| 5,319,826 A | 6/1994 | Mower |
| 5,325,564 A | 7/1994 | Swanepoel |
| 5,332,328 A | 7/1994 | Yang |
| 5,383,249 A | 1/1995 | Yang |
| 5,392,487 A | 2/1995 | Yang |
| 5,392,489 A | 2/1995 | Mohnach |
| 5,454,135 A | 10/1995 | Okuya et al. |
| 5,463,790 A | 11/1995 | Chiou et al. |
| 5,485,650 A | 1/1996 | Swanepoel |
| 5,509,166 A | 4/1996 | Wagner et al. |
| 5,553,962 A | 9/1996 | Eustache |
| 5,606,765 A | 3/1997 | Ding |
| 5,611,103 A | 3/1997 | Lee |
| 5,618,124 A | 4/1997 | Chen |
| 5,632,059 A | 5/1997 | Lee |
| 5,724,700 A | 3/1998 | Marks |
| 5,807,016 A | 9/1998 | Herring et al. |
| 5,885,023 A | 3/1999 | Witek et al. |
| 5,937,474 A | 8/1999 | Hussaini |
| 5,946,764 A | 9/1999 | Tworzydlo |
| 5,956,801 A | 9/1999 | Jeffer et al. |
| 6,000,093 A | 12/1999 | Charng |
| 6,158,078 A | 12/2000 | Kotlarski |
| 6,161,249 A | 12/2000 | Hussaini |
| 6,279,191 B1 | 8/2001 | Kotlarski et al. |
| 6,292,974 B1 | 9/2001 | Merkel et al. |
| 6,332,236 B1 | 12/2001 | Ku |
| 6,353,962 B1 | 3/2002 | Matsumoto et al. |
| 6,434,780 B1 | 8/2002 | Kotlarski |
| 6,523,218 B1 | 2/2003 | Kotlarski |
| 6,550,096 B1 | 4/2003 | Stewart et al. |
| 6,553,607 B1 | 4/2003 | De Block |
| 6,581,237 B1 | 6/2003 | Kotlarski |
| 6,591,445 B2 | 7/2003 | Nacamuli |
| 6,599,051 B1 | 7/2003 | Jarasson |
| 6,611,988 B1 | 9/2003 | De Block |
| 6,625,842 B1 | 9/2003 | De Block |
| 6,634,056 B1 | 10/2003 | De Block |
| 6,654,983 B1 * | 12/2003 | Raynaud .................... 15/250.32 |
| 6,665,905 B2 | 12/2003 | Wegner et al. |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,687,948 B2 | 2/2004 | Kotlarski |
| 6,779,223 B1 | 8/2004 | Roekens |
| 6,789,289 B2 | 9/2004 | Roodt |
| 6,792,644 B2 | 9/2004 | Roodt |
| 6,836,924 B2 | 1/2005 | Egan-Walter |
| 6,836,926 B1 | 1/2005 | De Block |
| 6,944,905 B2 | 9/2005 | De Block et al. |
| 6,966,096 B2 | 11/2005 | Bascotto et al. |
| 7,028,368 B2 | 4/2006 | Lee et al. |
| 7,055,207 B2 | 6/2006 | Coughlin |
| 7,150,066 B1 | 12/2006 | Huang |
| 7,207,082 B2 | 4/2007 | Lee |
| 7,228,588 B2 | 6/2007 | Kraemer et al. |
| 7,281,294 B2 | 10/2007 | Wllms et al. |
| 7,287,296 B2 | 10/2007 | Vacher |
| 7,451,520 B2 | 11/2008 | Weiler et al. |
| 7,523,522 B2 | 4/2009 | Herring et al. |
| 7,546,660 B2 | 6/2009 | Heinrich et al. |
| 7,581,279 B2 | 9/2009 | Baseotto et al. |
| 7,621,016 B2 | 11/2009 | Verelst et al. |
| 7,774,892 B2 * | 8/2010 | Coughlin .................... 15/250.32 |
| 8,042,218 B2 | 10/2011 | Moll et al. |
| 8,468,641 B2 * | 6/2013 | Coughlin .................... 15/250.32 |
| 2002/0026681 A1 | 3/2002 | Nacamuli |

(56) References Cited

U.S. PATENT DOCUMENTS

| | | |
|---|---|---|
| 2003/0159229 A1 | 8/2003 | Weiler et al. |
| 2004/0019997 A1 | 2/2004 | Baseotto et al. |
| 2004/0025281 A1 | 2/2004 | Baseotto et al. |
| 2004/0123414 A1 | 7/2004 | Lee |
| 2006/0130263 A1 | 6/2006 | Coughlin |
| 2007/0174989 A1 | 8/2007 | Moll et al. |
| 2008/0066254 A1 | 3/2008 | Vacher |
| 2009/0199357 A1 | 8/2009 | Thienard |

FOREIGN PATENT DOCUMENTS

| | | |
|---|---|---|
| DE | 1505397 A1 | 10/1969 |
| DE | 1655410 A1 | 8/1971 |
| DE | 2311293 A1 | 9/1974 |
| DE | 2336271 A1 | 2/1975 |
| DE | 2350302 A1 | 4/1975 |
| DE | 2353368 A1 | 5/1975 |
| DE | 2640399 A1 | 3/1977 |
| DE | 19729865 A1 | 1/1999 |
| DE | 19734843 A1 | 2/1999 |
| DE | 19814609 A1 | 10/1999 |
| DE | 10335393 A1 | 9/2004 |
| EP | 0594451 A1 | 4/1994 |
| EP | 1849666 * | 10/2007 |
| FR | 1069875 A | 2/1954 |
| FR | 2377302 A1 | 8/1978 |
| FR | 2515121 A1 | 4/1983 |
| GB | 878951 A | 10/1961 |
| GB | 1012902 A | 12/1965 |
| GB | 1489791 | 4/1975 |
| GB | 1395918 A | 5/1975 |
| GB | 2308542 A | 7/1997 |
| JP | 2007-331748 A | 12/2007 |
| WO | 0021809 A1 | 4/2000 |
| WO | 02087935 A1 | 11/2002 |
| WO | 03051696 A1 | 6/2003 |
| WO | 03080409 A1 | 10/2003 |
| WO | WO03/080409 * | 10/2003 |
| WO | 2004048163 A1 | 6/2004 |
| WO | 2004076251 A1 | 9/2004 |
| WO | 2004076252 A1 | 9/2004 |
| WO | 2006069648 A1 | 7/2006 |
| WO | 2009133979 A1 | 11/2009 |
| WO | 2011131395 A2 | 10/2011 |

\* cited by examiner

WIPER COUPLER AND WIPER ASSEMBLY INCORPORATING SAME

CROSS-REFERENCE TO RELATED APPLICATIONS

This is a divisional of U.S. Ser. No. 12/819,363 entitled "Wiper Coupler and Wiper Assembly Incorporating Same," and filed on Jun. 21, 2010 which is a continuation of U.S. Ser. No. 11/397,048 entitled "Wiper Coupler and Wiper Assembly Incorporating Same," and filed on Apr. 3, 2006 which claims benefit of U.S. Provisional Patent Application Ser. No. 60/668,025 entitled "Wiper Coupler and Wiper Assembly Incorporating Same," and filed on Apr. 4, 2005.

BACKGROUND OF THE INVENTION

1. Field of the Invention

The present invention relates, generally, to windshield wiper assemblies. More specifically, the present invention relates to a wiper coupler and windshield wiper assembly incorporating same for use in connecting the wiper assembly to the wiper arm of a vehicle.

2. Description of the Related Art

Conventional windshield wiper assemblies known in the related an include some type of wiper assembly mounted to an arm which, in turn, is mounted adjacent the windshield and pivotally driven to impart reciprocating motion to the wiper assembly across the windshield. A rubber wiping element is supported by the wiper assembly and contacts the windshield across the surface to be wiped. Generally, a wiper assembly may be classified into one of two categories commonly referred to as, "tournament-style" wiper assemblies and "beam-blade" wiper assemblies.

Tournament-style wiper assemblies include a superstructure having a primary lever carried by the arm, two or more secondary levers and a series of two or more tertiary levers. The primary lever is pivotally attached to the wiper arm by way of a coupler that is generally removable from both the wiper arm and the primary lever. The secondary levers are articulated to the primary lever at pivot points located at the opposed, lateral ends of the primary lever. Similarly, the tertiary levers are each articulated to a secondary lever at pivot points located at the opposed lateral ends of the secondary levers. The wiper element or blade is attached to the tertiary levers and contacts the surface to be wiped, which is generally a windshield. Often the blade of the Tournament-style wiper assembly is removable from the tertiary levers for replacement convenience. One example of a tournament-style wiper assembly can be found in U.S. Pat. No. 6,026,53 issued to Hojnaki on Feb. 22, 2000 and assigned to the Assignee of the present invention, Trico Products Corporation.

Beam-blade style wiper assemblies include a single elongated, homogeneous strip forming a spring backbone. The backbone is operatively coupled to the wiper arm by a fixed connecting formation at a central position. In a beam-blade style wiper assembly the reciprocally driven wiper arm applies a downward force and moves the blade assembly across the surface to be wiped, which is generally a windshield. The backbone is curved along a single plane which is the same plane of curvature as that defined by the windshield. A wiper element or blade is fixedly secured to the backbone. One example of a beam-blade style windshield wiper assembly can be found in U.S. Pat. No. 6,675,433 issued to Stewart, et al., on Jan. 13, 2004 and assigned to the Assignee of the present invention, Trico Products Corporation.

While each style of wiper assembly has worked for its intended purpose, beam blade-style wiper assemblies are limited for use with a particular style of wiper arm, while tournament-style wiper assemblies may be employed in connection with a variety of wiper arm styles. Specifically, the coupler of a beam blade-style wiper assembly is usually designed solely for use with a single type of wiper arm style, while a coupler of a tournament-style wiper assembly may operatively attach the assembly to any number of wiper arm styles. As a result, replacement tournament-style wiper assemblies are widely available in the aftermarket while replacement beam blade-style wiper assemblies are often only available though automotive dealerships that sell vehicles utilizing that particular style of wiper arm. Furthermore, as a result of the fixed blade and fixed coupler of the beam blade-style wiper assembly, when the blade becomes worn the only option is to replace the entire assembly. Conversely, the user of a tournament-style wiper assembly may choose to replace the entire tournament-style wiper assembly or opt to replace only the wiper element of a tournament-style wiper assembly.

As a result of the limited aftermarket availability and fixed blade design, beam blade-style wiper assemblies are generally more expensive than tournament-style wiper assemblies. Accordingly, there is a need in the art for a coupler that operatively attaches a tournament-style wiper assembly to a wiper arm designed for a beam blade-style wiper assembly. In addition, there is a need in the art for a coupler that operatively engages a wiper arm designed for a beam blade-style wiper assembly and tournament-style wiper assembly incorporating same having a replaceable blade.

SUMMARY OF THE INVENTION

The present invention overcomes many limitations and disadvantages in the related art in a wiper coupler, as well as a wiper assembly for use in connection with a wiper arm having an attachment member including a track defined by a base and rails depending therefrom, the base includes bent tab extending outwardly from the base, a passage defined within the base by a peripheral edge and a contoured protrusion extending from the-peripheral edge toward the center of the passage in substantially the same direction as the bent tab. According to this embodiment, the wiper assembly of the present invention includes a wiping element and a tournament-style superstructure to support the wiping element. The wiper assembly further includes a wiper coupler adapted to releasably attach the superstructure to a wiper arm attachment member. The wiper coupler includes a pair of side wails and a deck disposed between the sidewalls. The deck and a portion of the sidewalls cooperate to define a rest to operatively receive the track of a wiper arm attachment member. The deck also operatively engages a portion of the contoured protrusion of the wiper arm attachment member. The wiper coupler further includes an elevated platform disposed between the sidewalls and m aperture disposed between the deck and the elevated platform. The aperture operatively receives a portion of the bent tab of a wiper arm attachment member. Additionally, the deck of the wiper coupler further includes a cantilevered beam to operatively engage a portion of the peripheral edge of a wiper arm attachment member, thereby facilitating releasable attachment between the tournament-style superstructure and a wiper arm attachment member conventionally employed for use in connection with a beam blade-style wiper assembly.

Another embodiment of the present invention is directed toward a wiper coupler for use in releasably attaching a tournament style wiper assembly super structure to a wiper arm having an attachment member including a track defined by a base and rails depending therefrom with a bent tab extending outwardly from the base and guides that extend linearly downward from the rails. To this end, and according to one embodiment of the present invention, the wiper coupler includes a pair of sidewalls each including a post that extends transversely toward the other to operatively engage a tournament style wiper assembly super structure and a flange adapted to engage a portion of the guides of a wiper arm attachment member. Each of the flanges includes a barb that is adapted to operatively engage a portion of the guides of a wiper arm attachment member. A deck is disposed between the sidewalls mat cooperates with a portion of the sidewalls to define a rest adapted to operatively receive the track of a wiper arm attachment member. The deck includes a bridge that is adapted to provide a positive stop against a portion of the bent tab of the wiper arm attachment member. The wiper coupler further includes an aperture disposed adjacent to the deck that is adapted to receive a portion of the bent tab of a wiper arm attachment member to facilitate releasable attachment between a tournament style wiper assembly super structure and a wiper arm attachment member conventionally employed for use in connection with beam blade style wiper assemblies.

Thus, one advantage of the present invention is that the wiper coupler operatively engages a tournament-style wiper assembly to a wiper arm originally adapted to operatively engage a beam blade-style wiper assembly.

Another advantage of the present invention is that the wiper coupler provides a tournament-style wiper assembly as a replacement option to beam blade-style wiper assemblies, thereby reducing costs associated with replacing a beam blade-style wiper assembly.

Still another advantage of the present invention is that it provides a wiper assembly system having a replaceable wiping element to reduce the costs associated with replacing a beam blade-style wiper blade assembly.

Yet another advantage of the present invention is that it provides a wiper assembly system incorporating a replaceable wiping element to be replaced by readily available wiping elements to simplify the task associated with replacing a beam blade-style wiper assembly.

Other objects, features and advantages of the present invention will be readily appreciated as the same becomes better understood after reading the subsequent description taken in connection with the accompanying drawings.

DETAILED DESCRIPTION OF THE PREFERRED EMBODIMENTS

Figure 1:
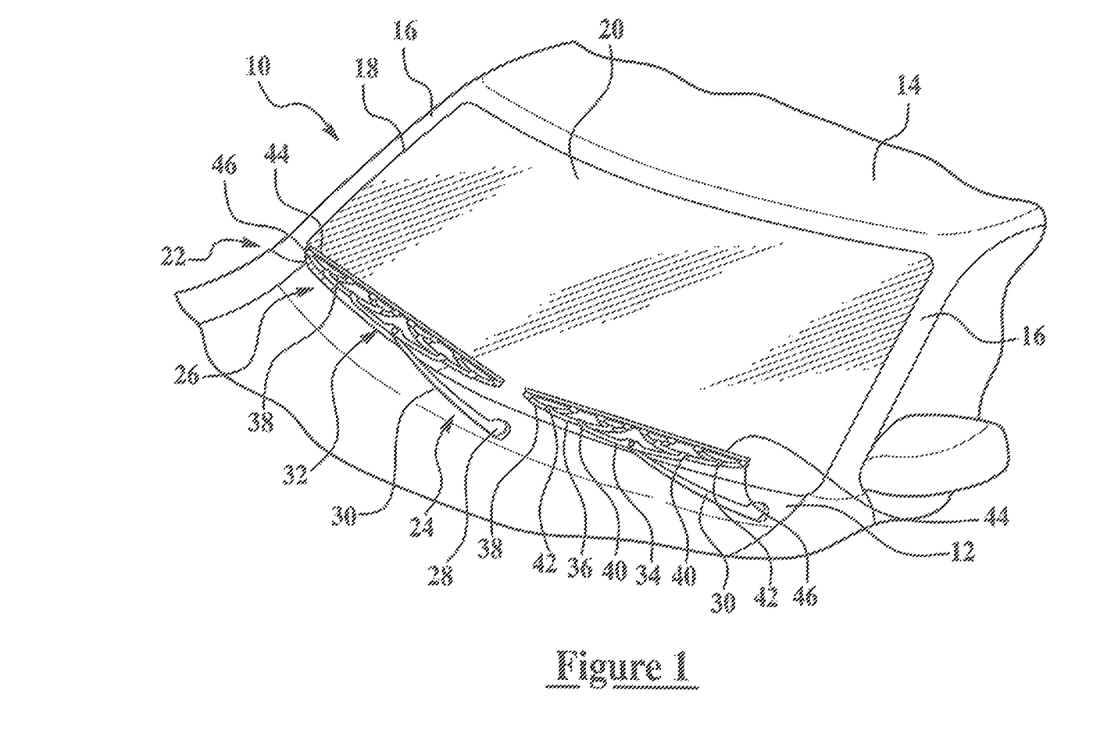
FIG. 1 is a partial perspective view of the front of an automotive vehicle having a pair of windshield wiper assemblies pivotally mounted for reciprocal movement across the windshield of the vehicle.

Referring now to the figures, where like numerals are used to designate like structure, a portion of a vehicle is schematically illustrated at 10 in FIG. 1. The vehicle includes a cowl 12, a roof 14, and a pair of laterally spaced front or "A" pillars 16 extending between the roof 14 and the cowl 12. The A-pillars 16, roof 14, and cowl 12 cooperate to define a generally rectangular opening 18 in which is supported a curved or "swept back" glass windshield 20.

A wiper system is generally indicated at 22 in FIG. 1 and is employed to clean the glass windshield 20. The wiper system 22 includes a wiper arm, generally indicated at 24 and a wiper assembly, generally indicated at 26. Those having ordinary skill in the art will appreciate that a wiper system 22 may include more than one wiper arm 24 and more than one wiper assembly 26. By way of example and as indicated in FIG. 1, a wiper system 22 may include a pair of wiper arms 24 and wiper assemblies 26, which correspond to the driver and passenger side of the vehicle 10.

The wiper arm 24 includes a pivot end operatively attached to an electrical motor (not shown) to move the wiper arm 24 across the surface to be wiped in an oscillating manner. The wiper arm 24 further includes an elongate body 30 that extends outward from a pivot end 28 and an attachment member, described in greater detail below. The elongate body 30 includes a predetermined length to direct the wiper assembly 26 across the appropriate surface area. Accordingly, it will be appreciated that the predetermined length of the elongate body 30 will vary depending on the surface area to be wiped. Furthermore, those having ordinary skill in the art will appreciate that the elongate body 30 may be jointed for movement away from the surface to be wiped in order to facilitate replacement of the wiper assembly 26 when worn or to perform other maintenance or repair to the wiper system 22 or adjacent area of the vehicle 10. In addition to these elements, the wiper arm 24 may further include a biasing member (not shown), such as a spring, to provide a biasing force that facilitates contact between the wiper assembly 26 and the windshield 20 of the vehicle 10.

Figure 2:
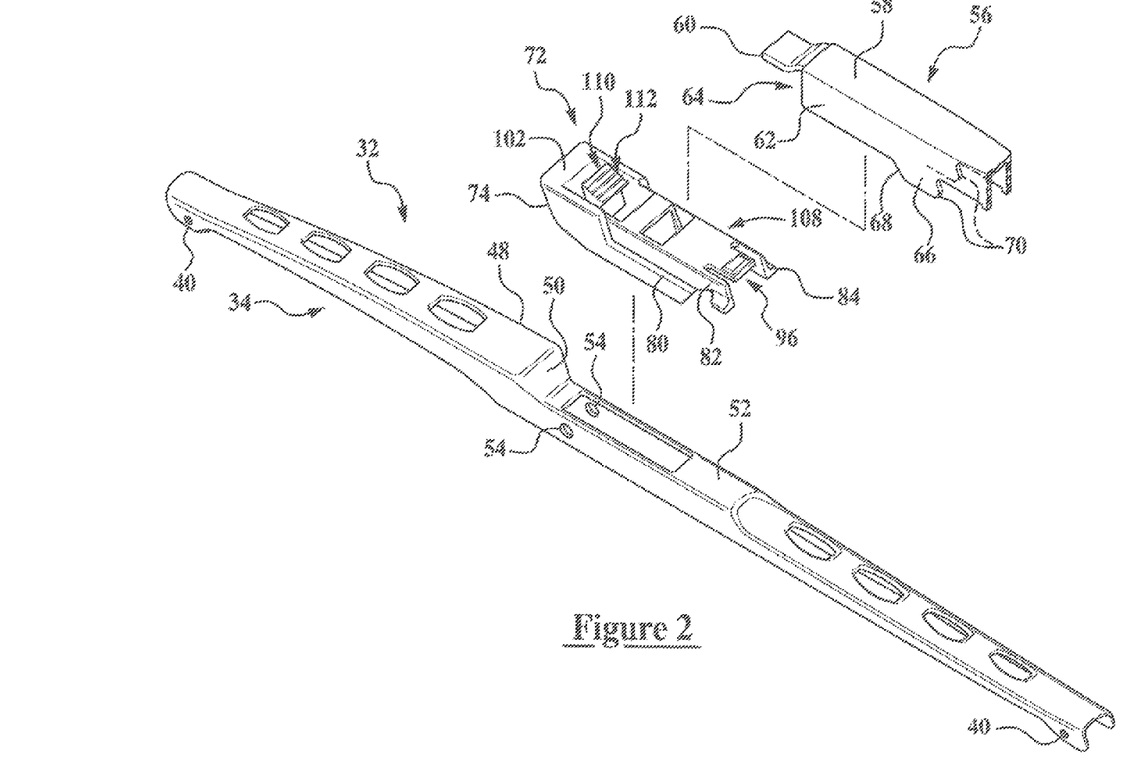
FIG. 2 is a fragmentary perspective view of a wiper arm attachment member aid a wiper coupler and primary lever of a wiper assembly in accordance with one embodiment of the present invention.

Referring to FIG. 2, the wiper arm 24 further includes an attachment member, generally indicated at 56 disposed at or adjacent to the end of the elongate body 30, opposite the pivot end 28. The attachment member 56 is adapted to operatively engage the wiper assembly 26, as will be described in greater detail below. The attachment member 56 includes a base 58 and bent tab 60 extending linearly outward from the base 58. The attachment member 56 further includes a pair of rails 62 depending from the base 58 aligned with respect to each other. The base 58 and rails 62 cooperate to define a track, generally indicated at 64, to operatively receive a portion of the wiper assembly 26 as will be described in greater detail below. Each of the rails 62 includes a guide 66 that extends linearly downward relative to the rails 62. Each of the guides 66 includes a leading edge 6$ and a trailing edge 70, the function of each will be described in greater detail below. The trailing edge 70 is angled relative to the base 58, such that the leading edge 68 and the trailing edge 70 form an acute angle. However, those having ordinary skill in the art will appreciate that trailing edge 70 may also extend substantially perpendicular relative to the base 58 without departing from the scope of the invention.

The wiper arm 24 having an attachment member 56 that includes the structure described above is commonly employed for connection with a beam blade-style wiper assembly and does not form part of this invention. Rather, those having ordinary skill in the art will appreciate that the present invention is a wiper coupler and tournament-style wiper assembly, described in greater detail below, that operatively attaches to an attachment member (exemplarily illustrated in FIGS. 2, 4, 5, 7, 8, 10 and 11) traditionally employed for attachment to a beam blade-style wiper assembly.

As illustrated in FIGS. 1 and 2, the attachment member 56 is operatively attached to a tournament-style wiper assembly 26. A tournament-style wiper assembly 26 includes a superstructure, generally indicated at 32. The superstructure 32 includes a primary lever, generally indicated at 34, and at least one secondary lever 36. Specifically, as shown in FIG. 1, the superstructure 32 includes two secondary levers 36 and a series of tertiary levers 38. The secondary levers 36 are articulated to the primary lever 34 at pivot points 40 located at the opposed, lateral ends of the primary lever 34. Likewise, the tertiary levers 38. are each articulated to a secondary lever 36 at pivot points 42 located at the opposed lateral ends of the secondary levers 36. However, those having ordinary skill in the art will appreciate that the superstructure 32 may take a number of different configurations without departing from the scope of the invention. By way of example, the superstructure 32 may include only a primary lever 34 and two secondary levers 36.

The wiper assembly 26 further includes a wiper element 44 operatively supported by the superstructure 32. The tertiary levers 38 include claws 46 formed on the opposed distal ends which secure one end of the wiper element 34 to the superstructure 32 while the other end of the wiper element 44 is operable for wiping action against the glass windshield surface 20. The wiper element 44 may be constructed from any suitable material that imparts a flexible quality when cured, such as rubber, silicone, or a polymer. Further, given that the wiper element 44 is virtually in constant contact with the windshield 20, it will likely wear prior to the other components of the wiper assembly 26. Accordingly, the wiper element 44 is removably secured to the superstructure 32 in order that it may be replaced when worn. Moreover, while the wiper element 44 is shown operatively supported by the tertiary levers 38 of the superstructure 32, those having ordinary skill in the art will appreciate that the wiper element 44 may be operatively supported by any one of the levers closest to the surface to be wiped. By way of example, where tertiary levers 38 are not employed with the superstructure 32, the wiper element 44 may be operatively supported by one or more secondary levers 36.

Referring to FIG. 2, the primary lever 34 includes a body 48 having an asymmetrical side profile. More specifically, the body 48 includes a step-down area 50 to receive a wiper coupler, described in greater detail below, and a low profile section 52 adjacent the step-down area 50. The low profile section 52 reduces the likelihood of interference with the wiper arm 24 during operation and farther reduces the likelihood of wind lift during operation. The primary lever 34 further includes a pair of aligned bores 54 adjacent the step down area 50 to operatively engage a wiper coupler, as will he described in greater detail below.

Referring to FIGS. 2-5, the wiper assembly 26 further includes a wiper coupler, generally indicated at 72. The wiper coupler 72 is operatively mounted to the superstructure 32 and is employed for connecting die wiper assembly 26 to the wiper arm 24. Specifically, the wiper coupler 72 releasably connects the primary lever 34 of the superstructure 32 to the attachment member 56 of the wiper arm 24. The wiper coupler 72 includes a pair of sidewalls 74. Each of the sidewalls 74 defines a surface 76 disposed generally opposed relative to the other. The opposed surfaces 76 include a recessed section 78 adapted to operatively engage the rails 62 of the attachment member 56. The recessed section 78 is partially defined within the opposed surfaces 76 by a lip 80 that is adapted to provide a positive stop with respect to the rails 62 of the attachment member 56 when the wiper assembly 26 is attached to the wiper arm 24.

Each recessed section 78 is finite defined by a flange 82 that extends outward beyond the lip 80 to provide releasable engagement with the attachment member 56. Specifically, each flange 82 includes a terminal edge 86 and a barb 84 disposed adjacent to the terminal edge 86. The barb 82 is adapted to engage the trailing edge 70 of the guides 66 and thereby facilitate the releasable engagement between the flange 82 and the guides 66 of the attachment member 56. The recessed section 78 further includes at least one raised façade 88 to provide an interference fit between the coupler 72 and the rails 62 of the attachment member 56. Those having ordinary skill in the art will appreciate that the raised façade also provides additional support to the sidewalls 74 and that the recessed section may include more than one raised façade.

Figure 5:
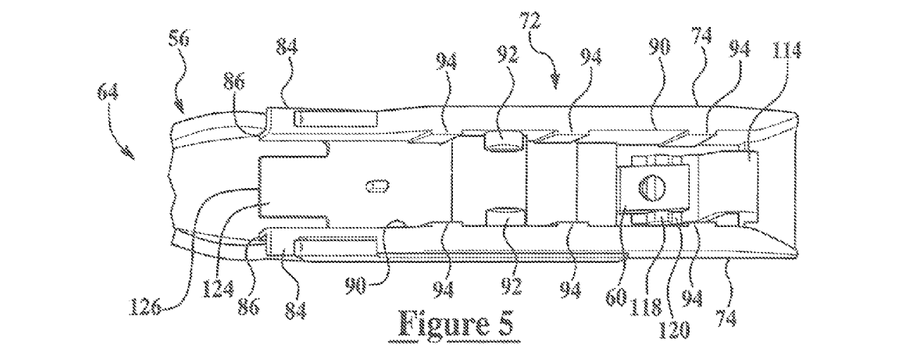
FIG. 5 is a fragmentary bottom view of the wiper arm attachment member and the wiper coupler in accordance with the embodiment illustrated in FIG. 4.

Referring to FIG. 5, each of the sidewalls 74 farther includes an inward surface 90 facing each other. The inward surfaces 90 are adapted to operatively engage a portion of the primary lever 34. The inward surfaces 90 include posts 92 that extend transversely from their respective inward surface 90 and toward each other. The posts 92 operatively engage the aligned bores 54 of the primary lever 34 and provide a bearing surface about which Ore primary lever 34 may pivot relative to the coupler 72. The inward surfaces 90 further include at least one support rib 94 to provide interference fit between the sidewalls 74 and the primary lever 34 as well as increase the structural integrity of the sidewalls 74. The inward surface 90 includes three support ribs 94. However, those having ordinary skill in the art will appreciate that the inward surface 90 may include any number of support ribs 94 without departing from the scope of the invention.

Referring to FIGS. 2-5, the wiper coupler 72 further includes a deck, generally indicated at 96, disposed between the sidewalls 74. The deck 96 cooperates with the recessed sections 78 of the sidewalls 74 to define a rest, generally indicated at 108, that is adapted to operatively receive the track 64 of the attachment member 56. The deck 96 includes a cantilevered beam 124 that is disposed between the flanges 82 to define a distal end 106 of the deck 96. The cantilevered beam 124 includes a raised portion 126 that is adapted to provide an interference fit against the track 64 of the attachment member 56, such that the cantilevered beam 124 is entirely disposed within the track 64 when the wiper coupler 72 is operatively attached to the wiper arm 24.

The deck 96 further includes a bridge 104 disposed between the sidewalls 74. The bridge 104 provides a stop to prevent on desired disconnect between the wiper arm 24 and the coupler 72. More specifically, should, the barbed flanges 82 unintentionally disengage from the guides 66, the bridge will stop the linear movement of the bent tab 60 relative to the coupler 72, so as to prevent the wiper arm 24 from separating from the wiper assembly 26. Those having ordinary skill lathe art will appreciate that, the bridge 104 further provides structural support between the sidewalls 74.

Figure 3:
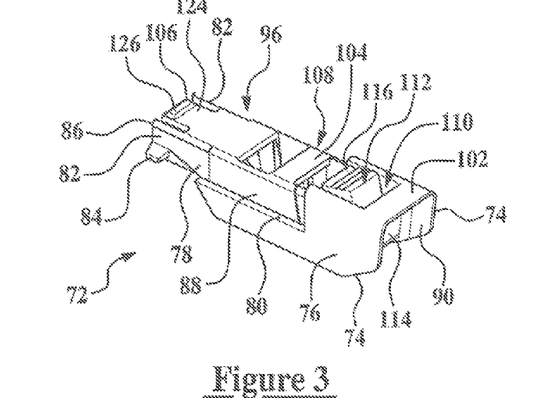
FIG. 3 is a perspective view of the wiper coupler in accordance with the embodiment illustrated in FIG. 2.
Figure 4:
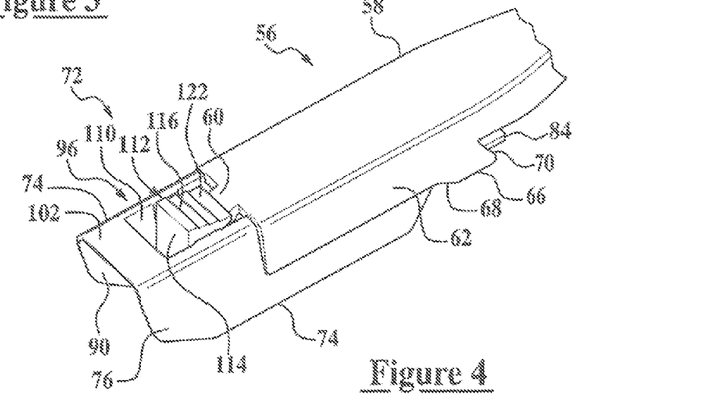
FIG. 4 is a fragmentary perspective view of a wiper arm attachment member and the wiper coupler in accordance with the embodiment illustrated in FIG. 2.

Referring to FIGS. 3-5, the wiper coupler 72 includes an elevated platform 102 disposed between the sidewalls 74 that cooperates with the sidewalls 74 and the bridge 104 to define an aperture 110 therebetween. Those having ordinary skill in the art will appreciate that the elevated platform 102 additionally provides structural support between the sidewalls 74. The coupler 72 further includes an engaging member, generally indicated at 112, that is disposed within the aperture 110. The engaging member 112 depends from the elevated platform 102 and includes a cantilevered body 114 and a bulbous head 116 disposed at the terminal end of the cantilevered body 114. The bulbous head 116 includes a stepped surface 122 to provide grip when releasing the wiper assembly 26 from the wiper arm 24, as will be described in greater detail below.

Referring to FIG. 5, the bulbous head 116 includes a ridge 118 depending therefrom. The ridge 118 is adapted to receive a portion of the bent tab 60 to prevent undesired release of the coupler 72 from the attachment member 56. More specifically, the ridge 118 provides an interference fit between a portion of the bent tab 60 and the engaging member 112. Additionally, those having ordinary skill in the art will appreciate that a wiper arm attachment member 36 may include additional structure, such as a lip or the like within the bent tab 60. Accordingly, the wiper coupler illustrated in FIGS. 2-5 accommodates such structure. More specifically, the ridge 118 and the cantilevered body 114 cooperate to define a slot 120. The slot 120 is adapted to receive a lip or similar structure disposed on the bent tab 60 to facilitate the operative attachment between the coupler 72 and the wiper arm attachment member 56.

The embodiment of the wiper assembly 26 of the present invention illustrated in FIGS. 2-5 is properly assembled when the wiper coupler 72 is sealed adjacent the step-down 50 of the primary lever 34 and the aligned posts 92 operatively engage the aligned bores 54. The embodiment of the wiper assembly 26 is properly attached to the wiper arm 24 by inserting the bent tab 60 within the aperture 110, so as to contact the ridge 118, and rotating the wiper assembly 26 such that the barbs 84 of the flanges 82 flex between the guides 66 and then expand outward to be seated adjacent the trailing edges 70. Proper attachment of the wiper assembly 26 is further achieved when the track 64 of the attachment member 56 is seated on the rest 108.

On the other hand, replacement of the wiper assembly of the present invention illustrated in FIGS. 2-5 is accomplished by applying force to the stepped surface 122 in a direction toward the elevated platform 102, thereby disengaging die bent tab 60 from contact with the ridge 118 and rotating the wiper assembly 26 such that the elevated platform 102 moves, away horn the bent tab 60. Removal of the wiper assembly 26 from the wiper arm 24 is achieved when, the barbed flanges 82 disengage front the trailing edge 70 of the guides 66.

Figure 6:
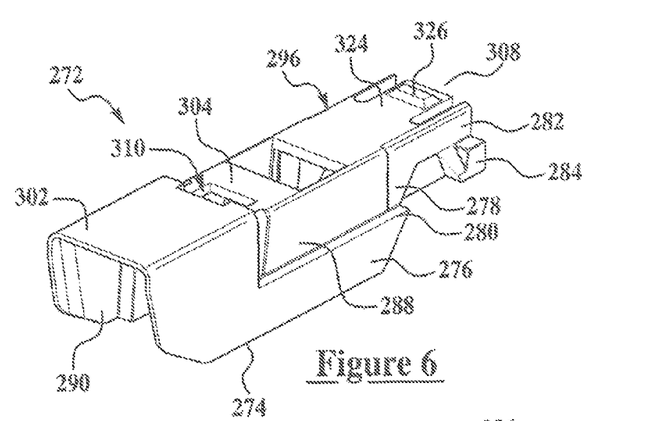
FIG. 6 is a perspective view of a wiper coupler in accordance with another embodiment of the present invention.
Figure 7:
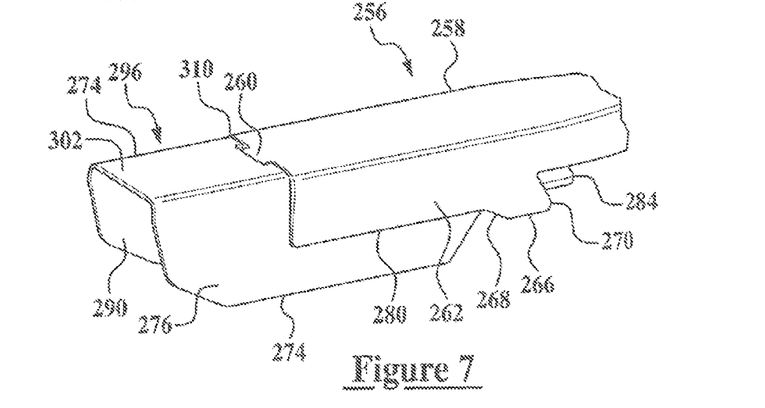
FIG. 7 is a fragmentary perspective view of a wiper arm attachment member of FIG. 2 and the wiper coupler in accordance with the embodiment illustrated in FIG. 6.
Figure 8:
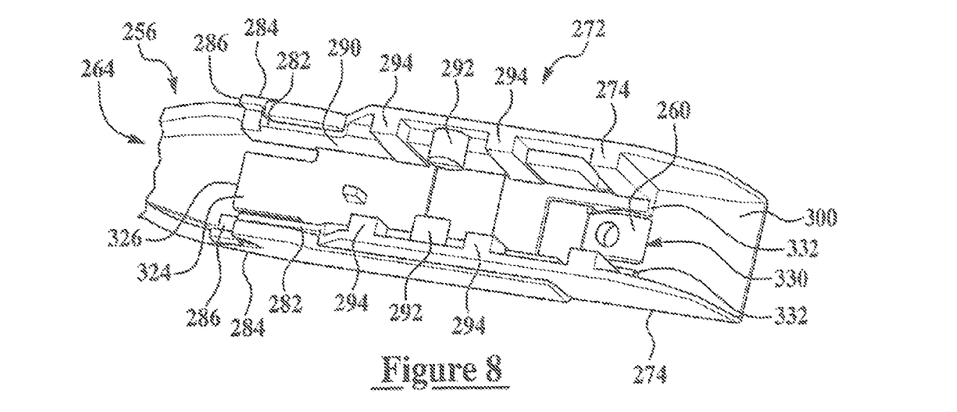
FIG. 8 is a fragmentary bottom view of the wiper arm attachment member and the wiper coupler in accordance with the embodiment illustrated in FIG. 7.

Another embodiment of the wiper coupler according to the present invention is generally indicated at 272 in FIGS. 6-8 where like numerals, increased by 200 with respect to the embodiment of the invention illustrated in FIGS. 2-5, are used to designate like structure. The wiper arm attachment member 256 and wiper coupler 272 as shown in FIGS. 6-8 includes similar structure as the wiper arm attachment member 56 and wiper coupler 72 shown in FIGS. 2-5 and so the description of like structure will not be repeated here except, where expressly mentioned below.

Similar to the embodiment illustrated in FIGS. 2-5, the wiper coupler 272 illustrated in FIGS. 6-8 is adapted to be operatively mounted to the superstructure 232 of a tournament-style wiper assembly 226 and employed for connecting a wiper assembly 226 to a wiper arm 224. According to this embodiment, the wiper coupler 272 includes a pair of sidewalls 274 having opposed surfaces 276. The opposed surfaces 276 include a recessed section 278 that is partially defined within the opposed surfaces 276 by a lip 280. Each recessed section 278 is further defined by a flange 282 that extends outward beyond the lip 280 and includes a barb 84 disposed, adjacent to the terminal edge 286. The recessed section 278 further includes at least one raised façade 288 having similar advantages to the raised façade 88 relative to FIGS. 2-5. Each of the sidewalls 274 further includes an inward surface 290 having a post 292 that operatively engages the aligned bores 254 of the primary lever 234. The wiper coupler 272 also includes a deck 296 having a bridge 304, and an elevated platform 302. The deck 296 and the recessed sections 278 of the sidewalls 274 cooperate to define a rest 308. Furthermore, the coupler 272 includes an aperture 310 disposed between the bridge 304 and the elevated platform 302.

However, unlike the embodiment illustrated in FIGS. 2-5, the embodiment of the wiper coupler 272 illustrated in FIGS. 6-8 does not include an engaging member 112 disposed within the aperture 310. Nor does tire wiper coupler 272 include structure related to the engaging member 112. Rather, the elevated platform 302 includes a subsurface 300 having a channel 330 defined by a pair of opposed stand-offs 332 depending from the subsurface 300 and adjacent to the aperture 310. The channel 330 is adapted to receive at least a portion of the hem tab 260 when the wiper coupler 272 is operatively attached to the wiper arm 224. The stand-offs 332 prevent undesired lateral movement of the bent tab 260 when disposed within the channel 330.

This embodiment of the wiper assembly 226 of the present invention is properly assembled when the wiper coupler 272 is seated adjacent the step-down 250 of the primary lever 234 and the aligned posts 292 operatively engage the aligned bores 254. The embodiment of the wiper assembly 226 is properly attached to Ore wiper arm 224 when the track 264 is seated on the rest 308 of the coupler 272. Specifically, proper attachment is accomplished by operative engagement between at least a portion of the bent tab 260 and the channel 330 within the subsurface 300 of the elevated platform 302 and subsequent engagement between the barbed flanges 282 and the trailing edges 270 of the guides 266.

Removal of the wiper assembly 226 that employs the wiper coupler 272 illustrated in FIGS. 6-8 from a wiper arm attachment member 256 is achieved by squeezing the barbed flanges 282 together until they disengage from contact with the trailing edge 270 of the guides 206 and pivoting the wiper assembly 226 about the bent tab 260 and away from the wiper arm 224, such that the displacement between the barbed flanges 282 and the trailing edge 270 is increased. Removal is accomplished when the bent tab 200 may be removed from the channel 330 without encountering interference between the flanges 282 and the guides 266.

Figure 9:
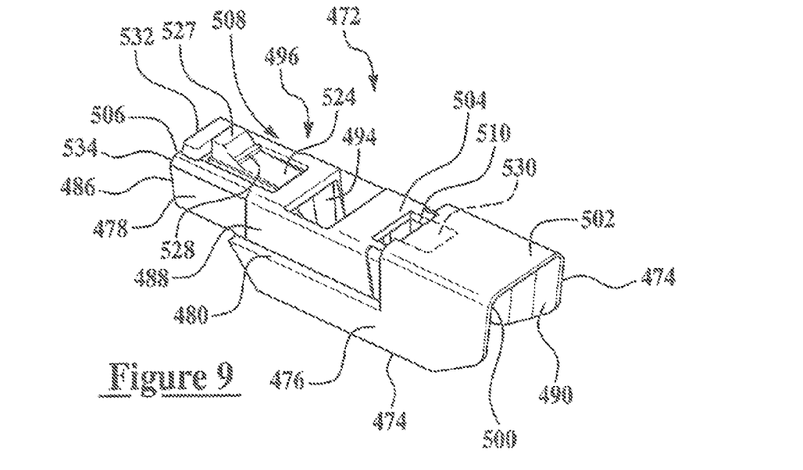
FIG. 9 is perspective view of yet another embodiment of a wiper coupler in accordance with the present invention.
Figure 10:
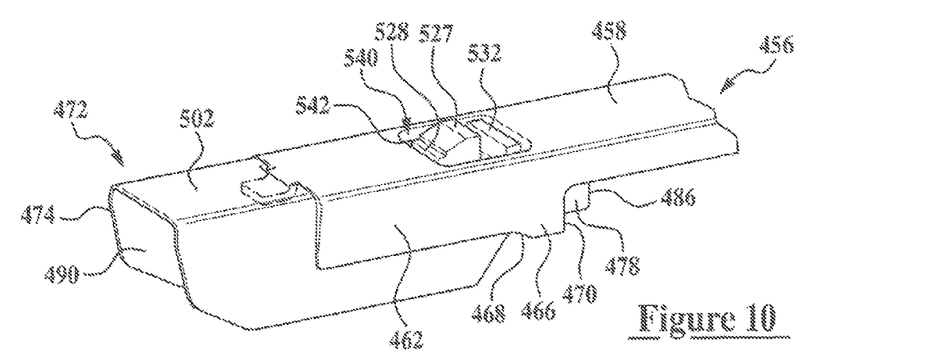
FIG. 10 is a fragmentary perspective view of another embodiment of a wiper arm attachment member and the wiper coupler in accordance with the embodiment illustrated in FIG. 9.
Figure 11:
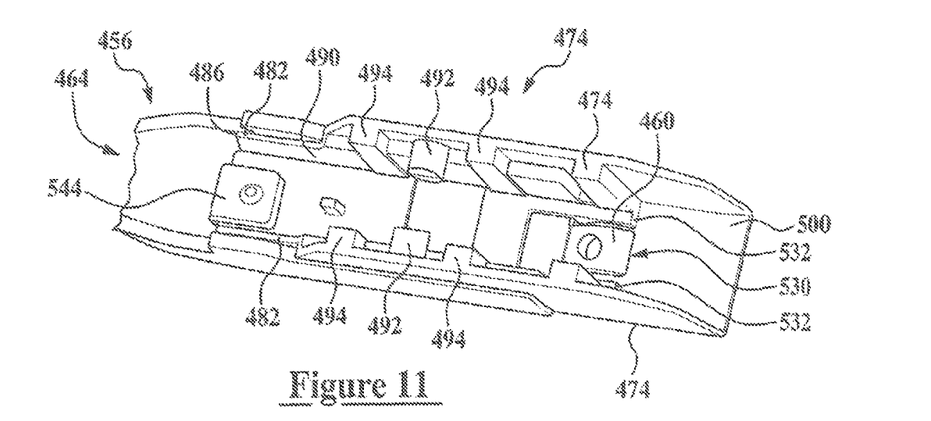
FIG. 11 is a fragmentary bottom view of the wiper arm attachment member and the wiper coupler in accordance with the embodiment illustrated in FIG. 10.

Another embodiment of the wiper coupler of the present invention is generally indicated at 472 in FIGS. 9-11 where like numerals, increased by 400 with respect to the embodiment of the invention illustrated in FIGS. 2-5, are used to designate like structure. The wiper coupler 472 as shown in FIGS. 9-11 includes similar structure to the wiper coupler 2 shown in FIGS. 2-5 and so the description of like structure will not be repeated here, except where expressly mentioned below.

Similar to wiper coupler 72 illustrated in FIGS. 2-5, the wiper coupler 472 illustrated in FIG. 5 is adapted for use in connection with a wiper arm 424 having an attachment member 456 typically employed for use in connecting to a beam blade-style wiper assembly. Yet, similar to the two above-described embodiments, the wiper coupler 472 illustrated in FIG. 9 is operatively mounted to the superstructure 432 of a tournament-style wiper assembly 426 and adapted to releasably couple the wiper assembly 426 to a wiper arm 424. More specifically, the wiper coupler 472 interconnects to the primary lever 434 in the same manner as that described above with respect to the embodiments of the present invention illustrated in FIGS. 2-8. However, the wiper coupler 472 is adapted for use in connection with a wiper arm attachment member 456 that includes different structure than the attachment member 56, 256 illustrated with respect to FIGS. 2-8.

Referring to FIGS. 10 and 11, the wiper arm attachment member 456 includes a base 458, bent tab 460, rails 462, guides 466 having a leading edge 468 and trailing edge 470 similar to the attachment member 56, 256 illustrated in FIGS. 2-8. However, the wiper attachment member 456 further includes a includes a passage, generally indicated at 540, defined within the base 458 by a peripheral edge 542 and a contoured protrusion 544 extending from the peripheral edge 542 toward the center of the passage 540, such that the contoured protrusion 544 and the bent tab 460 extend in substantially the same direction. Further unlike the attachment member illustrated in FIGS. 2-8, the guides 466 of the attachment member 456 extend substantially perpendicular to the base 458, for reasons which will be described in greater detail below. However, those having ordinary skill in the art will appreciate that the specific angle is not critical and the leading and mailing edges 461 and 470 of the guides 466 may cooperate to define an angle similar to that illustrated in FIGS. 2-8.

Referring to FIGS. 9-11, the wiper coupler 472 includes a pair of sidewalls 474 having a recessed section 478 adapted to operatively engage the rails 462 of the attachment member 456. The recessed section 478 is partially defined within the opposed surfaces 476 by a lip 480 that is adapted to provide a positive stop with respect to the rails 462 of the attachment member 456 when the wiper assembly 426 is attached to the wiper arm 424. However, unlike the couplers 72, 272 illustrated in FIGS. 2-8, the recessed section 478 of the wiper coupler 472 does not include flanges 82, 282. Rather, the recessed section 478 extends linearly outward beyond the lip 480 as defined by the terminal edge 486, which corresponds with the distal edge 506 of the deck 496.

The wiper coupler 472 further includes a deck 496 having a bridge 504, and an elevated platform 502 disposed between the sidewalls 474. The deck 496 and recessed sections 478 cooperate to define a rest 508 to receive the track 464 of the attachment member 456. Furthermore, the coupler 472 includes an aperture 510 disposed between the bridge 504 and the elevated platform 502 to receive the bent tab 460 of the attachment member 456, as described relative to the embodiment of the coupler 272 illustrated in FIGS. 6-8. More specifically, the bent tab 460 is operatively received within the channel 530 of the subsurface 500 as defined by a pair of opposed stand-offs 532.

The coupler 472 further includes a cantilevered beam 524. However, unlike the cantilevered beams 124, 324 illustrated in FIGS. 2-8, the cantilevered beam 524 is disposed adjacent the distal edge 506 of the deck 496, such that it is defined within the deck 496. The cantilevered beam 524 includes protuberant 527 having a shoulder 528 to operatively engage a portion of the peripheral edge 542 of the passage 540. The coupler 472 further includes a cross-member 532 disposed along the distal edge 506 of the deck 496, adjacent to the cantilevered beam 524. The cross-member 532 is adapted to operatively engage a portion, of the contoured, protrusion 544 when the attachment, member 456 is operatively engaged to the wiper coupler 472. Those having ordinary skill in the art will appreciate that the cross-member 532 also provides increased strength of the wiper coupler 472 between the sidewalls 474.

Accordingly, when the attachment member 456 is operatively engaged to the wiper coupler 472, the cross member 532 and the protuberant 527 are both operatively disposed within the passage 540 of the attachment member 456. Furthermore, proper attachment between the wiper coupler 472 and attachment member 456 results in the bent tab 460 disposed within the aperture 510, adjacent the channel 530, and the contoured protrusion 544 seated between the sidewalls 474, beneath the deck 496 and adjacent the distal edge 507. Attachment of the wiper coupler 472 to the primary lever 434 occurs in the same manner as that described relative to the embodiments illustrated in FIGS. 2-8. Removal of the wiper assembly 426 from the wiper arm 424 is achieved by depressing the protuberant 527 of the cantilevered beam 524 and moving the wiper assembly 426 in a linear, but slightly angular, direction relative to the attachment member 450, such that the bent tab 460 and contoured protrusion 544 disengage contact with the wiper coupler 472.

In this way, the wiper system, of the present invention provides a wiper assembly including a wiper coupler that operatively connects a tournament-style superstructure to a wiper arm traditionally employed for connection to a beam blade-style wiper assembly. Accordingly, the present invention provides a wiper assembly having a tournament-style superstructure as a replacement option for vehicles previously equipped with beam blade-style wiper assemblies, thereby reducing costs associated with replacing a beam blade-style wiper assemblies. The present invention provides a tournament-style wiper assembly for use in connection with a wiper arm traditionally employed for attachment to a beam blade-style wiper assembly where the tournament-style superstructure retains a removable wiper element, thereby eliminating the need to replace an entire wiper assembly. Accordingly, the removable wiper element of the wiper assembly of the present invention reduces costs associated with replacing beam blade wiper blade-style assemblies by providing a tournament-style wiper assembly including a wiper coupler adapted to operatively engage a wiper arm traditionally employed for connection with a beam blade-style wiper assembly.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A wiper coupler for use in releasably attaching a tournament-style wiper assembly superstructure to a wiper arm having an attachment member including a track defined by a base and rails depending therefrom, a bent tab extending outwardly from the base and guides that extend linearly downward from the rails, said wiper coupler comprising:

a pair of sidewalls each including a post that extends transversely toward the other to operatively engage a tournament-style wiper assembly superstructure and a flange adapted to engage a portion of the guides of a wiper arm attachment member, each of said flanges including a barb that is adapted to operatively engage a portion of the guides of a wiper arm attachment member; and a deck disposed between said sidewalls that cooperates with a portion of said sidewalls to define a rest adapted to operatively receive the track of a wiper arm attachment member, said deck including a bridge that is adapted to provide a positive stop against a portion of the bent tab of a wiper arm attachment member, said wiper coupler further including an aperture disposed adjacent to said deck that is adapted to receive a portion of the bent tab of a wiper arm attachment member and an elevated platform having an engaging member depending therefrom to operatively engage a portion of a bent tab of a wiper arm attachment member, said engaging member having a cantilevered body defining a terminal end thereon, said cantilevered body disposed within said aperture and including a bulbous head at the terminal end of said cantilevered body, said bulbous head adapted to actuate movement of said cantilevered body to facilitate releasable attachment between a tournament-style wiper assembly superstructure and a wiper arm attachment member conventionally employed for use in connection with a beam blade-style wiper assembly.

2. The wiper coupler as set forth in claim 1 wherein said bulbous head includes a ridge depending therefrom and adjacent to said cantilevered body that is adapted to operatively engage a portion of a bent tab of a wiper arm attachment member and provide an interference fit between said engaging member and the bent tab.

3. The wiper coupler as set forth in claim 1 further including an elevated platform including a subsurface having a pair of opposed stand-offs depending therefrom, said stand-offs cooperating to define a channel that is adapted to operatively receive a portion of the bent tab of a wiper arm attachment member, said stand-offs adapted to prevent undesired lateral movement of the bent tab when operatively received within said channel.

4. The wiper coupler as set forth in claim 1 wherein each of said sidewalls further includes an opposed surface having a recessed section that cooperates with said deck to define said rest, said recessed sections partially defined by a lip disposed on said opposed surfaces, said lips adapted to provide a positive stop relative to the rails of a wiper arm attachment member.

\* \* \* \* \*